United States Patent
Willis

(10) Patent No.: US 6,275,769 B1
(45) Date of Patent: Aug. 14, 2001

(54) WEIGHT AND BALANCE CALCULATOR FOR AIRCRAFT

(76) Inventor: Rodney Stephen Willis, 2760 S. Hatcher Pass St., Wasilla, AK (US) 99654

( * ) Notice: Subject to any disclaimer, the term of this patent is extended or adjusted under 35 U.S.C. 154(b) by 0 days.

(21) Appl. No.: 09/432,844

(22) Filed: Nov. 1, 1999

(51) Int. Cl.[7] .................................................. G06F 17/10
(52) U.S. Cl. ......................... 701/124; 701/14; 244/118.1; 244/118.2
(58) Field of Search ................................. 701/3, 13, 14, 701/124; 244/158 R, 117 R, 118.1, 118.2

(56) References Cited

U.S. PATENT DOCUMENTS

| | | | | |
|---|---|---|---|---|
| 3,584,503 | * | 6/1971 | Senour ................................. | 701/124 |
| 4,446,524 | * | 5/1984 | Wendt ................................. | 701/124 |
| 4,502,555 | * | 3/1985 | Gower ................................. | 701/124 |
| 4,639,872 | * | 1/1987 | McHale et al. ..................... | 701/124 |
| 4,831,538 | * | 5/1989 | Cucchiari et al. .................. | 701/200 |
| 4,935,885 | * | 6/1990 | McHale et al. ..................... | 701/124 |

FOREIGN PATENT DOCUMENTS

WO 91/14931 * 10/1991 (EP) ..................................... 701/124

* cited by examiner

*Primary Examiner*—William A. Cuchlinski, Jr.
*Assistant Examiner*—Gertrude Arthur

(57) ABSTRACT

A hand-held computer that displays the aircraft floor plan with passenger and baggage compartments shown on a pad, with which a pilot can calculate the Center of Gravity (CG) of an aircraft by simply entering the load weights for different areas of an airplane. The floor plan can be changed for different aircraft. Next to each section of the plane is a button that, when pressed, allows a pilot to enter data for that section. As the pilot adds weight to each section, the computer can calculate the CG for the loaded aircraft. The computer can display the total weight, CG and other data related to the plane. The device can also printout the data for use as a manifest or for other documentation purposes. The device is the size and shape of a clipboard. In one version, the floor plan is fixed. In a second version, the floor plan can be changed for different aircraft.

14 Claims, 3 Drawing Sheets

WEIGHT AND BALANCE CALCULATOR FOR AIRCRAFT

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to weight and balance calculators and particularly weight and balance calculators for small aircraft.

2. Description of Related Art

Airplanes fly because of a balance of four forces, lift, gravity, drag and thrust. Part of task of balancing these forces is knowing the center of gravity of a given aircraft. The center of gravity (CG) of an aircraft changes depending on the load in the aircraft and its location within the aircraft. Thus, a fully loaded plane of passengers and baggage has a different CG as passengers deplane and as luggage is unloaded. This occurs at every stop. Under flight rules, pilots must now keep track of the CG at all stops for a given flight. While sophisticated devices exist for weighing commercial jets for CG calculations, these systems are too expensive and cumbersome for pilots of small aircraft. Although the CG calculation can be made at the small plane's base of operations, it is not so easily calculated at remote terminal airports.

BRIEF SUMMARY OF THE INVENTION

The instant invention is a device that allows pilots to calculate the CG of an aircraft by simply entering the load weights for different areas of an airplane. The device is a hand-held computer that displays the aircraft floor plan with passenger and baggage compartments shown on the pad. The floor plan can be changed for different aircraft. Next to each section of the plane is a button that, when pressed, allows a pilot to enter data for that section. As the pilot adds weight to each section, the computer can calculate the CG for the loaded aircraft. The computer can provide the total weight, CG and other data related to the plane. The device can provide a printout of the data for use as a manifest or for other documentation purposes. In one embodiment, the device is the size and shape of a clipboard. A portion of the device has a slot to accept a floor plan chart that has a chip embedded in it that contains the data for that particular floor plan. The chart is inserted into the device, which connects the chip to the computer. Once installed, the computer calculates the CG and other information for that particular airplane. The pilot can change the floor plan chart for whatever plane he is flying. In a second embodiment, the floor plan chart is fixed. In this embodiment, the device is stored on an airplane that matches the particular floor plan. A pilot assigned to that aircraft takes the device from that plane and makes the calculations in the normal manner. When the flight is over, the pilot retrieves the printout from the device and leaves the device in the plane.

DETAILED DESCRIPTION OF THE INVENTION

Figure 1:
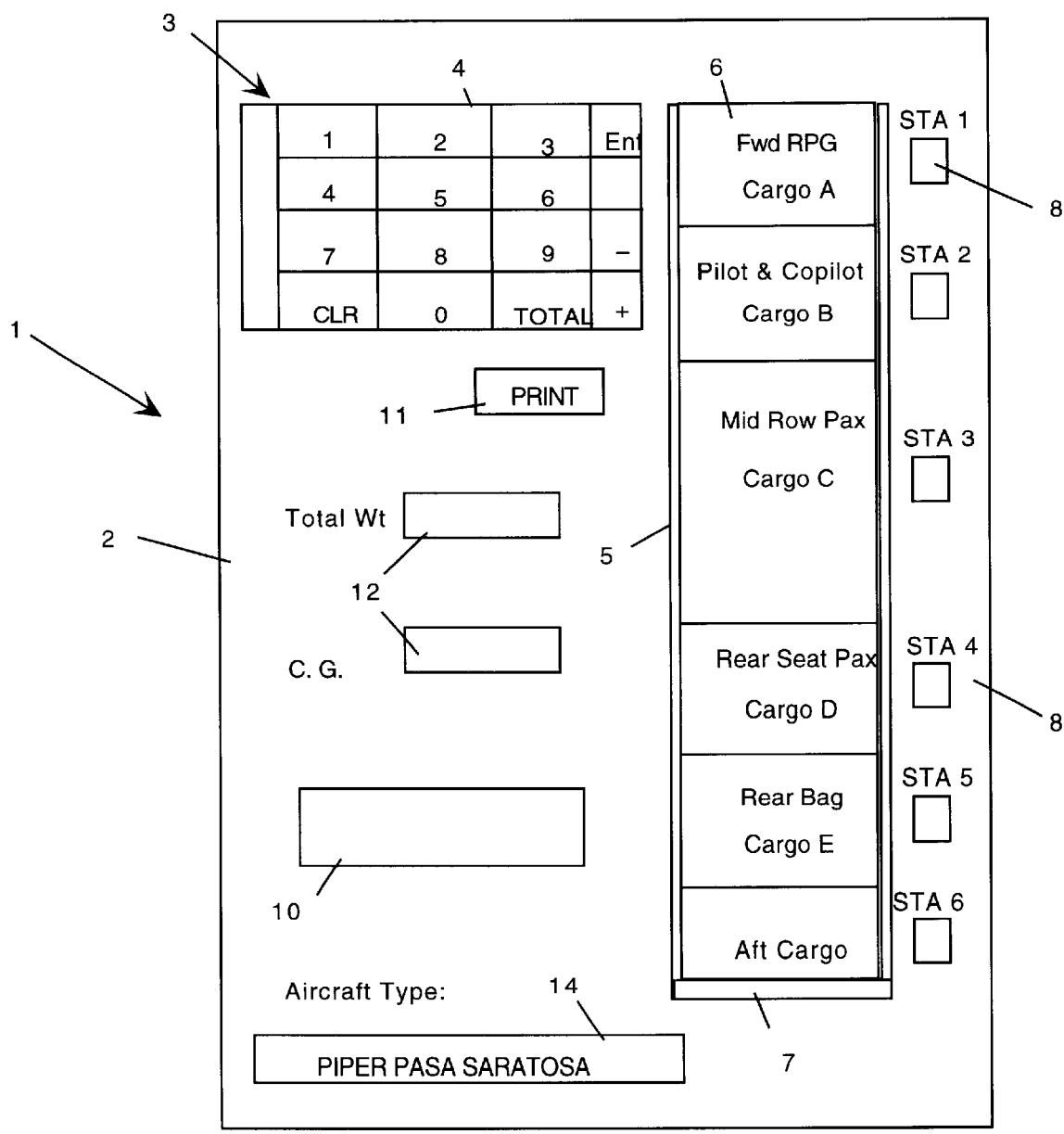
FIG. 1 is a front view of one embodiment of the invention.
Figure 3:
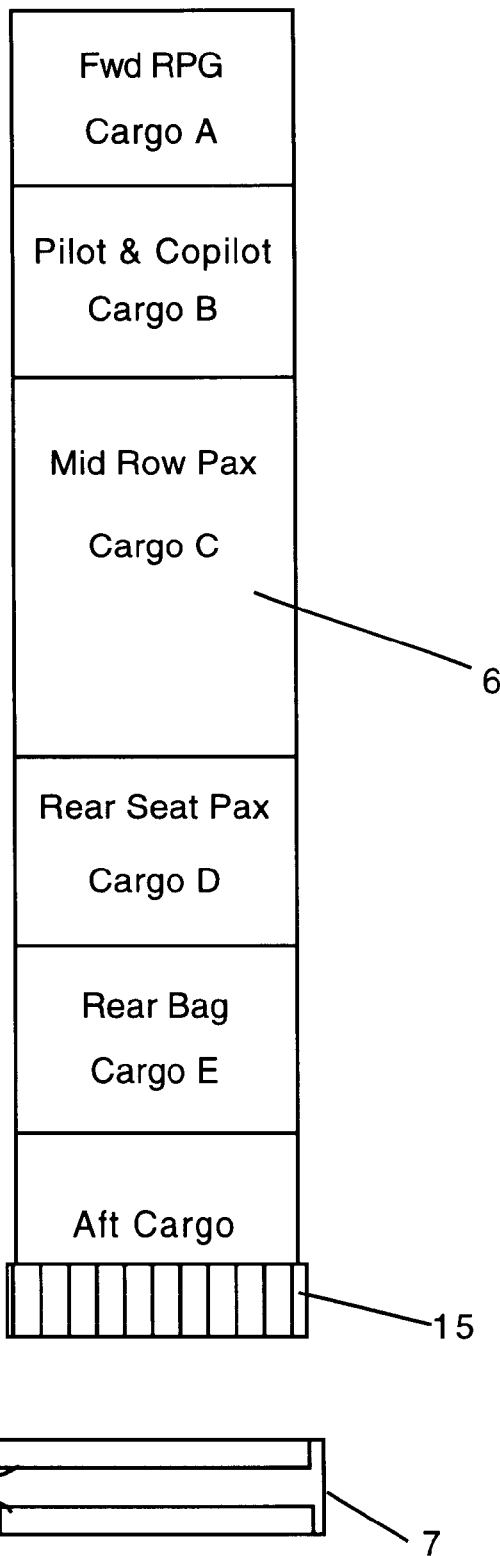
FIG. 3 is a front view of a removable floor plan chart.

Referring now to FIG. 1, a front view of the first embodiment is shown. This embodiment is designed to be about the size of a standard clipboard. It is designed to have a minimal thickness, as compatible with the electronics and printing requirements. In the first embodiment, the device 1 has a housing 2. The housing 2 has a keypad 3 in the upper left quadrant. Note that the position of the keypad or any of the controls and displays can be relocated. The keypad 3 has a number of keys 4 as indicated. The use of the keys is discussed below. To the right of the keypad 3 is a rectangular track 5 the track 5 is designed to hold a removable floor plan card 6. When installed, the floor plan card 6 is inserted into a socket 7, which is located at the bottom of track 5. Next to the track 5 is a series of buttons 8. In the preferred embodiment, six buttons 8 are used. The floor plan card is divided into six zones or areas corresponding to the storage/cargo/passenger cabins on an airplane. One button corresponds to each area of the floor plan as shown on FIG. 1. FIG. 1 shows the floor plan card in place. FIG. 3 shows a detail of the floor plan card and its receiving socket. The device includes a small printer 10 and a printer control button 11. The device also has a total weight display of the center of gravity 12. The device, also includes a display of the type of aircraft represented by the floor plan 14. In the first embodiment, this display can be a digital display that provides a readout from the floor plan card. It is also possible to use a paper display that can be changed when the floor plan card is changed. However, this is not preferred because of the chance for error.

Figure 2:
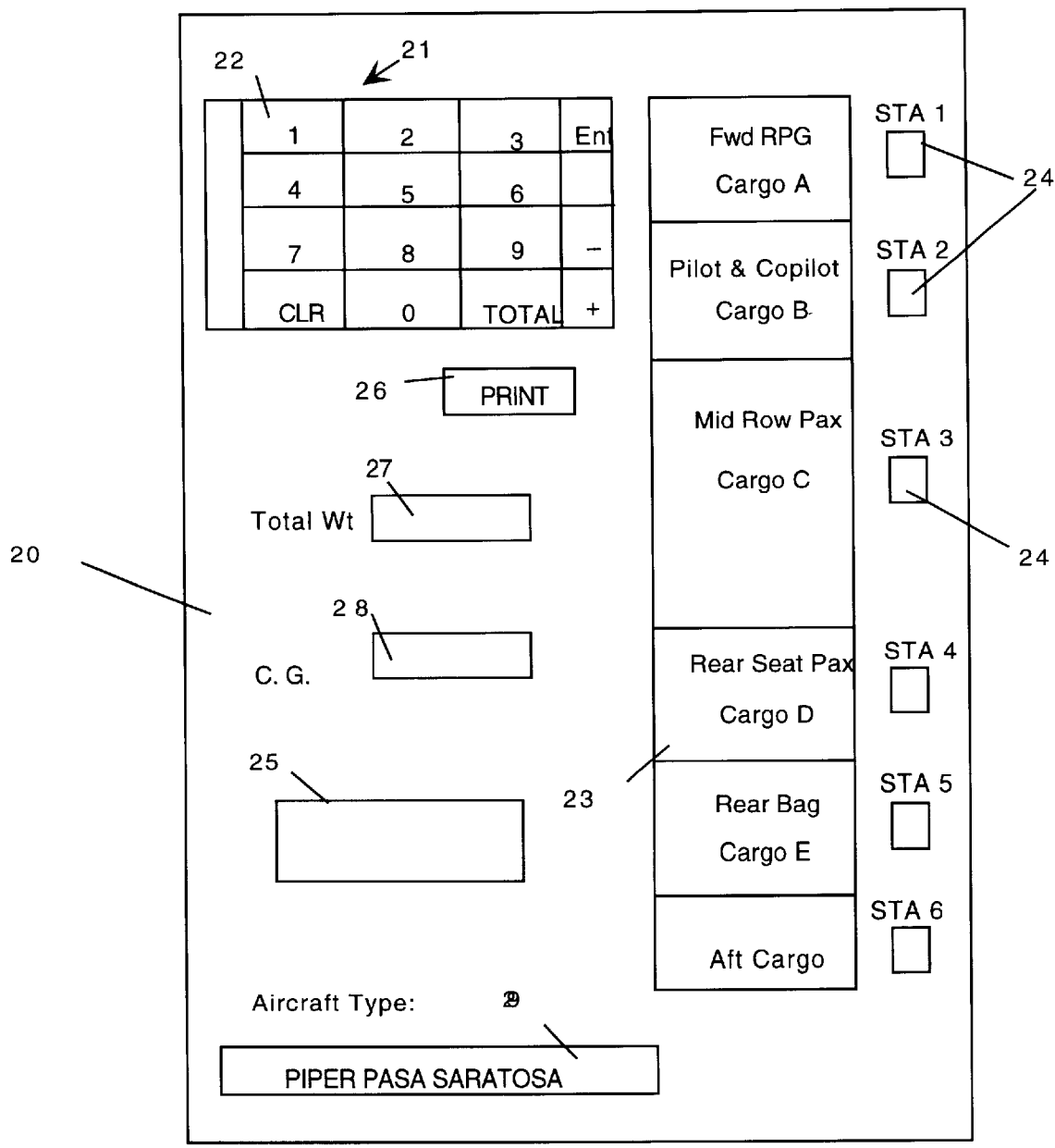
FIG. 2 is a front view of the second embodiment of the invention.

FIG. 2 shows the second embodiment. In this embodiment, the basic components are the same. However, the track is removed and the floor plan card is permanently installed. In this embodiment, the device remains in the aircraft, as it is a designated unit. Here, the type of aircraft is also displayed. This display can be permanent, unlike the display of the first embodiment. Referring to FIG. 2, the main components of this embodiment are the housing 20. The keypad 21 has a number of keys 22 as indicated. The use of the keys is discussed below. To the right of the keypad 21 is a fixed-in-place floor plan card 23. Next to the floor plan card 23 is a series of buttons 24. In the preferred embodiment, six buttons 24 are used. Like the first embodiment, the floor plan card is divided into six zones or areas corresponding to the storage/cargo/passenger cabins on an airplane. One button 24 corresponds to each area of the floor plan as shown on FIG. 2. The device includes a small printer 25 and a printer control button 26. The device also has a total weight display 27 and a display of the center of gravity 28. The device also includes a display of the type of aircraft represented by the floor plan 29.

FIG. 3 shows details of the removable floor plan card 6. The base of the card has an interface strip 15 that fits into socket 7. Note that in this figure, the socket 7 is shown from the top view. This shows the interior of the socket 7m, which is normally aligned with the interface strip 15. The socket 7 has terminal strips 16 that make electrical connection with the interface strip. These connections allow data to be read from the card as to the structure of the plane and its name, for use in the main device.

In either embodiment, the CG is determined by a standard formula. Generally:

Total Moment (divided by) Total weight=Center of Gravity

Where the total weight is a given amount of weight, the total moment is the turning moment about the center of gravity and the center of gravity is the position of the center of gravity for a given load weight the is disbursed through an aircraft. This point is called the ARM.

The device includes a central processing unit and a memory storage system for holding the data and performing the calculations. These devices are common to the art.

As each weight for a given station is entered, the device totals that weight and its position in the aircraft. A running weight total as well as a running moment total is stored. When the entries are complete, the user presses the total button and the device then divides the total weight by the total moment, which then produces the ARM location of the aircraft.

Basic data, such as the empty weight and the location of the empty ARM are stored in the device's memory—either within the fixed floor plan version, or stored on the removable floor plan card.

Both versions include a small printer 10, as discussed above. Using the printer, a pilot can obtain a record for each leg of a flight. These records then act as a flight manifest.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A device for determining a center of gravity for an aircraft comprising:
   a) a housing;
   b) a plurality of data entry buttons, said plurality of data entry buttons in a substantial alignment;
   c) an airplane floor plan, being adjacent to said plurality of data entry buttons, whereby said airplane floor plan is divided into a plurality of discrete sections, and further such that one of said plurality of discrete sections aligns with one of said plurality of data entry buttons in a sequential order;
   d) a means for entering weight quantities associated with each of said discrete sections;
   e) a memory storage system, whereby said memory storage system contains at least a set of structural details for an airplane;
   f) a central processing unit; and
   g) a means for displaying an output, operatively connected to said central processing unit.

2. The device for determining a center of gravity for an aircraft of claim 1, wherein said airplane floor plan is stored in a memory storage system embedded on a removable card.

3. The device for determining a center of gravity for an aircraft of claim 1 wherein the means for entering weight quantities includes a numerical keypad.

4. The device for determining a center of gravity for an aircraft of claim 1 further comprising a means for printing an output from said device.

5. The device for determining a center of gravity for an aircraft of claim 1 wherein a center of gravity for an aircraft is determined by the following equation: Total Moment (divided by) Total weight=Center of Gravity.

6. A device for determining a center of gravity for an aircraft comprising:
   a) a housing;
   b) a plurality of data entry buttons, said plurality of data entry buttons in a substantial alignment;
   c) an airplane floor plan, being adjacent to said plurality of data entry buttons, whereby said airplane floor plan is divided into a plurality of discrete sections, and further such that one of said plurality of discrete sections aligns with one of said plurality of data entry buttons;
   d) a means for entering weight quantities associated with each of said discrete sections;
   e) a memory storage system, whereby said memory storage system contains at least a set of structural details for an airplane;
   f) a central processing unit;
   g) a means for displaying an output, operatively connected to said central processing unit;
   h) a means for printing data stored within said memory storage system.

7. The device for determining a center of gravity for an aircraft of claim 6, wherein said airplane floor plan is stored in said memory storage system within said housing.

8. The device for determining a center of gravity for an aircraft of claim 6 wherein the means for entering weight quantities includes a numerical keypad.

9. The device for determining a center of gravity for an aircraft of claim 6 wherein a center of gravity for an aircraft is determined by the following equation: Total Moment (divided by) Total weight=Center of Gravity.

10. A device for determining a center of gravity for an aircraft comprising:
    a) a housing;
    b) a plurality of data entry buttons, said plurality of data entry buttons in a substantial alignment;
    c) a receiver slot, within said housing to receive a data card;
    d) a data card, having an image of an airplane floor plan formed thereon, and further such that the airplane floor plan is divided into a plurality of discrete sections, and further such that one of said plurality of discrete sections aligns with one of said plurality of data entry buttons;
    e) a means for entering weight quantities associated with each of said discrete sections;
    f) a memory storage system, whereby said memory storage system contains at least a set of structural details for an airplane;
    g) a central processing unit; and
    h) a means for displaying an output, operatively connected to said central processing unit.

11. The device for determining a center of gravity for an aircraft of claim 10 further comprising a plurality of data entry cards, each data entry card having a floor plan of an aircraft printed thereon.

12. The device for determining a center of gravity for an aircraft of claim 10 further comprising a means from printing an output from said device.

13. The device for determining a center of gravity for an aircraft of claim 10 wherein the means for entering weight quantities includes a numerical keypad.

14. The device for determining a center of gravity for an aircraft of claim 10 wherein a center of gravity for an aircraft is determined by the following equation: Total Moment (divided by) Total weight=Center of Gravity.

* * * * *